Patented Oct. 16, 1928.

1,688,053

UNITED STATES PATENT OFFICE.

GROVER C. MILLER, OF SOUTH PASADENA, AND JOSEPH F. KURKA AND LEWIS B. CHASE, OF LOS ANGELES, CALIFORNIA, ASSIGNORS TO KELP-OL LABORATORIES, INCORPORATED, OF LOS ANGELES, CALIFORNIA, A CORPORATION OF CALIFORNIA.

AGAR MEDICAL COMPOUND.

No Drawing. Application filed May 14, 1927. Serial No. 191,545.

This invention relates to agar medical compounds and is more particularly related to a compound including a vehicle for carrying lactic acid or the like through the human digestive system into the intestines or colon.

In order to alleviate intestinal toxemia, intestinal stasis and other similar intestinal diseases or troubles, resort has been had to the planting of *Bacillus acidophilus* in the intestines. The purpose of planting *Bacillus acidophilus* in the intestines or colon is to obtain the lactic acid which is given off by these organisms.

The production of lactic acid in the intestines or colon by the carrying of the *Bacillus acidophilus* into the intestines or colon is employed on the theory that toxicogenic intestinal micro-organisms such, for example, as *Bacillus coli*, *Bacillus welchii*, *Bacillus proteus*, *Bacillus putreficus* and similar micro-organisms will not thrive in an acid medium. The effect of planting the *Bacillus acidophilus* organisms in the colon or intestines is, therefore, to produce a struggle between these organisms on the one hand and the toxicogenic intestinal micro-organisms on the other hand, and if sufficient *Bacillus acidophilus* is implanted in the colon or intestines to secrete sufficient lactic acid, the toxicogenic intestinal micro-organisms are stifled. To accurately control the amount of *Bacillus acidophilus* introduced directly into the colon or intestines and to control accurately the cultivation of the same in the colon or intestines is difficult, if not impossible.

An object of this invention is, therefore, to provide a means of carrying lactic acid in definite predetermined quantities into the colon or intestines to produce within the colon or intestines an acid medium within which toxicogenic intestinal micro-organisms will not thrive.

Another object of this invention is to provide a means of carrying lactic acid into the colon or intestines in the manner in which the quantity of lactic acid may be accurately controlled and carrying the lactic acid into the colon or intestines in a vehicle such, for example, as agar-agar, or any similar vehicle, which may serve as a culture-medium for the *Bacillus acidophilus* which may be present within the intestines or colon.

Another object of this invention is to provide a means of carrying lactic acid or the like into and through the large and small intestines so as to distribute the lactic acid throughout the intestines to combat the toxicogenic intestinal micro-organisms throughout both intestines.

Another object of this invention is to provide a mild laxative including agar-agar, liquid petrolatum, and lactic acid emulsified in water, through which suitable flavorings and preservatives have been added, and which emulsion contains approximately 10 per cent anhydrous agar-agar, which serves as a vehicle for carrying the lactic acid which is present in a proportion of about ¼ per cent by volume.

Other objects and advantages of this invention it is believed will be apparent from the following detailed description of a preferred embodiment thereof.

We have discovered that lactic acid and other acids such, for example, as malic, citric or almost any organic or mineral acid may, if properly prepared or compounded with a suitable vehicle, be carried through the digestive tracts of the human system so as to avoid the digestive secretions, and into the colon or intestines in a manner to produce in the colon and the intestines an acid condition within which the toxicogenic intestinal micro-organisms will not thrive. We prefer and have found lactic acid to be the most advantageous acid to be employed for the creation of such an acid condition within the colon or intestines.

We have also found that in order to procure an effective treatment that the acid, lactic acid, should be carried into the colon and intestines in a vehicle which will effect a thorough evacuation of the intestines and colon. We have found that agar is a vehicle by means of which the acids may be effectively carried through the digestive system, as agar is a carbohydrate which is not appreciably affected by the digestive secretions of the stomach. Other substances, however, may be employed as a vehicle for carrying the acid through the digestive system and into the colon and intestines.

A preferred form of compound prepared for the purpose of acting as a carrier for the lactic acid is preferably formed in accordance with substantially the same process as is specifically set forth in the patent issued to Grover C. Miller, No. 1,605,130, November 2, 1926.

The following is given as an illustrative example of the proportions and manner of preparing this product, which we have found to be most advantageous. In order to prepare one pint of the preparation, including the acid, the following proportions are employed:

|  | Per cent. |
| --- | --- |
| Agar-agar (anhydrous) | 10 |
| Pure mineral oil | 37.5 |
| Sugar and flavoring | 2. |
| Glycerine | 2. |
| Lactic acid | .25 |
| Sodium benzoate | .25 |
| Sodium chlorite | .13 |

Distilled water to make up a pint.

The agar-agar is preferably boiled in water to which the acid has been added until a fluid. The fluid solution obtained of the agar-agar in water is then stirred while the sodium chlorite, sodium benzoate, vanelline and sugar are added, the heating of the mixture being continued until all of these substances are dissolved. The oil is then preferably added in either one of two methods. The oil is heated and added to the solution of agar and water while the stirring is continued, and then the whole mass transferred to an agitator within which the entire mass is agitated for approximately five minutes and then the glycerine is added. After the glycerine has been added the entire mass is agitated until cooled. In accordance with the second method the agar and water solution containing the flavorings and preservatives is heated up to approximately boiling, and is added to the oil in a mixing machine of any suitable or desirable type, and the agitation continued for about five minutes, at which time the glycerine is added and the agitation of the mass is then continued until the entire preparation is cooled.

As set forth in the prior patent issued to Grover C. Miller, the acid serves an additional function in the preparation of a liquid petrolatum agar-agar compound in that it effects a material reduction of the fluid of the compound produced.

The use of acids in the combating of toxicogenic intestinal micro-organisms has been limited and rendered difficult heretofore when endeavoring to implant acid secreting bacilli such, for example, as *Bacillus acidophilus*, due to the fact that it has not been possible to keep the proper culture of the acid secreting bacilli in any of the cultures which have been employed for any considerable length of time. *Bacillus acidophilus* milk, that is, a milk in which *Bacillus acidophilus* is cultured, will not keep more than a week and retain the proper amount of bacilli. Attempts have been made to compound *Bacillus acidophilus* with agar-agar in the form of a jelly, coating the jelly with chocolate or the like, as a pill, but the same difficulty is herein encountered in that the *Bacillus acidophilus* within the agar-agar does not keep and it is doubtful in many instances whether or not there is introduced into the human system any effective *Bacillus acidophilus* by this latter treatment. The acid employed in accordance with this invention not only insures that the same will be carried through the digestive system and into the colon and intestines, but also acts as an agent to prevent the formation in the agar-agar mineral oil preparation embodying this invention, of fungus, which rapidly forms when acid is not employed in the preparation of the compound.

Agar is also an effective culture-medium for *Bacillus acidophilus*, and it will, therefore, be apparent that the introduction of a compound embodying this invention, into the system, provides not only an accurate means by which definite quantities of acid may be introduced into the system but agar also provides a culture-medium through which any *Bacillus acidophilus* which may be present within the colon or intestines is cultured, so as to meet an acid condition within the colon and intestines throughout a comparatively long period of time.

Having fully described our invention it is to be understood that we do not wish to be limited to the details herein set forth which may obviously be varied without departing from the spirit of our invention as defined by the appended claims.

We claim:

1. A medical compound including mineral oil, agar and lactic acid in an amount sufficient to be carried into the intestines to exert an inhibitive action on any toxic intestinal flora, and not less than 25/100 per cent.

2. An agar-agar liquid petrolatum emulsion including substantially 35.5 per cent mineral oil, 10 per cent anhydrous agar-agar, and lactic acid in an amount sufficient to be carried into the intestines to exert inhibitive action on any toxic intestinal flora, and not less than 25/100 per cent and water.

Signed at Los Angeles, Calif., this 2nd day of May 1927.

GROVER C. MILLER.
JOSEPH F. KURKA.
LEWIS B. CHASE.